May 18, 1926.
W. A. HARRIS
1,584,934
ADJUSTABLE PRESSURE FEED AND EQUALIZING CHUCK FOR INFLATING HOSE
Filed Sept. 15, 1924
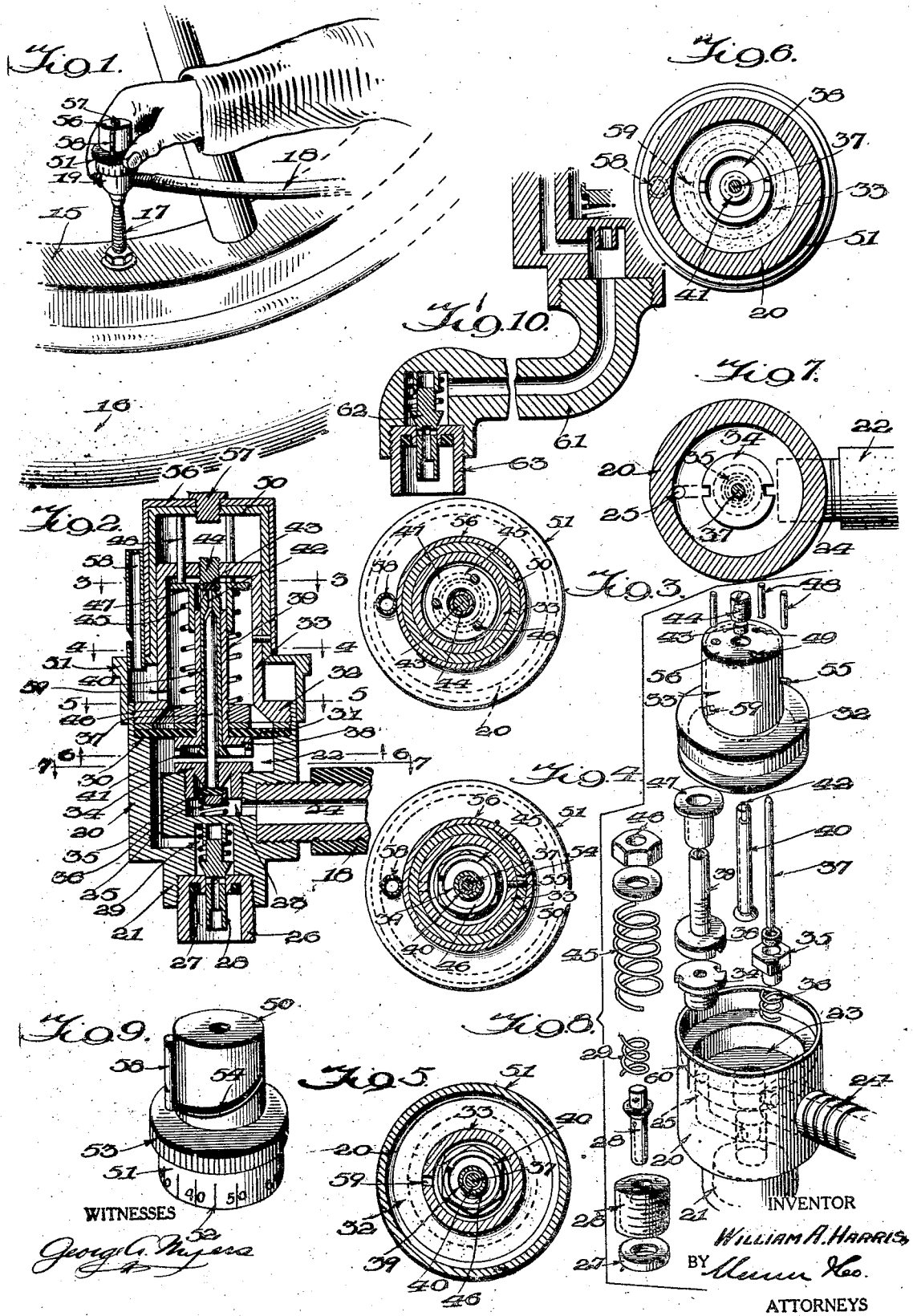

Patented May 18, 1926.

1,584,934

UNITED STATES PATENT OFFICE.

WILLIAM A. HARRIS, OF GREENVILLE, SOUTH CAROLINA, ASSIGNOR, BY DIRECT AND MESNE ASSIGNMENTS, TO THE G. & H. TIRE CHUCK GAUGE COMPANY, OF GREENVILLE, SOUTH CAROLINA, A CORPORATION OF SOUTH CAROLINA.

ADJUSTABLE PRESSURE FEED AND EQUALIZING CHUCK FOR INFLATING HOSE.

Application filed September 15, 1924. Serial No. 737,886.

My present invention relates generally to the power inflation of pneumatic tires and the like, ordinarily accomplished from a power supply of air as for instance an air compressor, through a flexible air hose having at its free or service end a chuck or head provided with a valve therein which opens when the chuck or valve is pressed upon the exposed end of a tire valve stem.

It is well known that it is necessary under ordinary circumstances to leave the chuck on the valve stem until the operator considers sufficient pressure has been introduced into the tire to inflate the latter to the desired number of pounds per square inch and then verify his guess by the subsequent use of a pressure gauge. This operation consumes considerable time as it is frequently necessary to either reapply the chuck for the introduction of more pressure or let out some of the pressure in case too much has already been introduced. The operation is moreover attended in most instances with doubtful results as the ordinary pressure gauge utilized for this purpose is known to be of decreasing efficiency as the requisite pressures of tires lower especially with the introduction of the present day balloon and balloon type tires.

My invention has as its primary object the provision of a chuck for inflation hose having means whereby it may be adjusted to supply pressure to a tire up to a certain point for which it has been adjusted, irrespective of the air pressure in the hose. A further object is to provide a chuck of the above character which will act to bring the tire pressure down to the previously set pressure, should the tire have been over-inflated, and a still further object is to provide a chuck having a signal by virtue of which the operator will be notified when the previously set pressure has been reached, whether air has been forced in, or allowed to flow from the tire in order to reach the set pressure.

My invention therefore is not only a great help to the tire user by insuring correct tire pressure promptly and easily but is also of advantage to the service stations in that it avoids the great waste of air pressure existing at the present time, and my invention aims to secure these advantages by the provision of a device which will be accurate at low as well as high pressures, which will be strong, rugged and durable, and which may be applied to valve stems with equal facility as compared to the usual chuck.

In the accompanying drawing which illustrates my present invention and forms a part of this specification, Figure 1 is a perspective view illustrating the practical application of my invention.

Figure 2 is a central vertical sectional view taken through my improved chuck, showing the parts in their normal position with the chuck in connection with a source of pressure supply, Figures 3, 4, 5, 6 and 7 are horizontal sectional views taken respectively on lines 3—3, 4—4, 5—5, 6—6 and 7—7 of Figure 2, Figure 8 is a detail perspective view showing the chuck body and the parts carried therein, in detached relation, Figure 9 is a detail perspective view of the adjustable cap with its cover or hood removed, and Figure 10 is a detail side view, partly broken away and in section showing an offset discharge nipple for the chuck in order to facilitate its application to tire valves of truck wheels and certain disk wheels.

Referring now to these figures and particularly to Figure 1 I have shown portions of an automobile or other wheel 15 having a pneumatic tire 16 the valve stem 17 of which projects inwardly through the felly of the wheel. I have also shown at 18 an inflation hose through which pressure is supplied from any suitable form of air compressor or other source of air supply, to a valved chuck capable of application to the valve stem 17, the valve of the chuck being closed to prevent the outflow of pressure from the hose 18 except when this chuck is applied to the receiving end of the valve stem. I have shown in Figure 1 a chuck generally indicated at 19, of the character proposed by my present invention whereby upon application to a pneumatic tire or valve stem after setting of the chuck to the desired pressure, the pressure of the tire will be brought to that desired pressure, either by supplying air to the tire if under-inflated or by allowing air to flow from the tire if over-inflated, the chuck being provided with means whereby the operator will be notified when the tire has been brought to such pressure.

In order to accomplish the foregoing my invention proposes a chuck having a body 20 of generally cylindrical form, provided with a reduced internally threaded extension 21 at one end and having a main bore 22 communicating by means of an air inlet channel 23 with an air intake nipple 24 and also communicating by means of an air outlet channel 25 with the bore of the extension 21.

The intake nipple 24 is threaded into one side of the body 20 and outstands therefrom for telescoping connection with one end of the air hose 18, a valve stem engaging nipple 26 being threaded into the extension 21 as shown in Figure 2, having therein a gasket 27 and a valve stem 28 normally closed by a spring 29 which prevents the escape of air from the chuck. When the nipple 26 is placed upon the end of the valve stem as in Figure 1 the valve 28 is shifted to open position against the tension of spring 29 and air is free to pass from the bore 22 of the chuck body through the air outlet channel 25 to the tire valve stem.

The bore 22 of the body 20 opens, at the opposite end of the body with respect to the reduced extension 21, into a counterbore, which forms an annular shoulder 30 facing upwardly within the upper portion of the body 20 for the reception of the outer edge of a diaphragm 31, the outer edge of which is clamped on its seat by the threading of the lower enlarged end 32 of a valve cylinder 33 withing the counterbore.

Within the air intake channel 23 of the body a plug 34 is threaded in axial alinement with the body, this plug having an axial bore and having around the lower end of its bore a valve seat against which a valve member 35 normally seats upwardly under tension of a spring 36. This valve member 35 is securely held upon the lower end of a stem 37, said stem projecting loosely through the bore of the plug 34 so that when the valve member 35 is forced downwardly off of its seat, the air intake channel 23 is thus open from the air intake nipple 24 to the bore 22 of the body below the diaphragm 31.

Clamped axially through the diaphragm 31 is the lower head 38 of a hollow vertical post 39 and within this post, is a tubular member 40 having at its lower end a flaring valve member 41 above the plug 34, seating upwardly against a seat in the head 38 around the lower end of the hollow of its post. This tubular member 40 has a bore extending upwardly therein from its lower end for the major portion of its length, upwardly into which the beforementioned stem 37 loosely projects and said member 40 is also provided with a reduced axial opening 42 through its upper tapering end, the lower or inner end of which opening communicates with its bore so that with the valve tube 40 in lower position air may find its way upwardly around the stem 37 through the upper opening 42 into the chamber within the valve cylinder 33 for a purpose which will be presently described.

Normally the upper tapering end of the valve tube 40 seats against a soft rubber gasket 43 within a screw 44 adjustably threaded axially through the upper end of the valve cylinder 33 and its internal shoulder between its upper opening 42 and its lengthwise bore receives thereagainst the upper end of the stem 37 when the lower valve member 35 of this stem is seated in connection with the plug 34, although it is to be understood stem 37 is loose within the tube 40 and the upper end of said stem has no valve function.

Around the hollow upright post 39 in which the tubular valve 40 is loosely disposed, a coil spring 45 is extended and compressed between the diaphragm clamping nut 46 and an upper thimble 47 which movably telescopes the upper end of the post 39 and which receives thereagainst the lower ends of a series of pins 48 loosely disposed intermediate their ends through openings 49 disposed in a series in the upper end of the valve cylinder 33 around the axial opening through which the valve seat holding screw 44 is extended.

The upper ends of the pins 48 are engaged by the upper end of a cap 50 movably telescoping the valve cylinder 33 and provided with a lower enlarged cylindrical portion 51 movably telescoping the upper end of the chuck body 20, this lower enlarged portion 51 of the cap being circumferentially graduated as at 52 and seen in Figure 9 and also having an annular milled rib 53 in order that the cap may be conveniently rotated by the operator.

The cap 50 is also provided with an inclined slot 54 extending partly therearound and receiving the outer end of a pin 55 secured in and projecting radially from the valve cylinder 33 so that when the cap is rotated it will by virtue of the pin 55 and slot 54, be shifted axially so as to control the position of the pins 48 and thus control the tension of spring 45 and the effective action of this spring against the upper surface of the diaphragm 31.

That portion of the cap 50 which movably telescopes the valve cylinder 33 is covered by a conformably shaped hood 56, which thus covers the slot 54 so as to prevent the entranse of dirt and foreign matter, this hood or cover being secured to the cap by virtue of an upper central fastening screw 57.

The cap 50 moreover carries an upstanding whistle tube 58 whose lower portion is secured into the offset thereof adjacent to its lower enlarged cylindrical portion 51 so as to communicate at its lower end with the space within the enlarged cylindrical portion 51 above the chuck body 20. With this space the interior of the valve cylinder 33 is in communication through an opening 59 in the wall of said cylinder and thus any air finding its way into the cylinder 33 either around the tubular valve 40 when the lower valve member 41 thereof is unseated, or through the opening 42 when the upper end of this valve tube is shifted away from the seat 43, will find its way outwardly through the opening 59 and through the whistle tube, the cap continuously sounding during such escape of air.

Thus in operation it is obvious that by grasping the milled rib 53 of the cap and rotating the cap until the desired pressure is reached by alining the particular graduation 52 with an indicating line 60 on the external surface of the chuck body 20, the operator manually controls, through the rods 48 and the spring bearing thimble 47, the tension of the diaphragm spring 45 so that an air pressure of the set amount within the body bore 22 will balance the spring pressure and hold the parts in the position shown in Figure 2 which is the normal position, the valve members 35 and 41 and the upper end of the tubular valve 40 being seated. Since the chamber 22 will be placed in communication with the pressure service line through 24 whenever the spring 45 overcomes the pressure in said chamber, there will always be sufficient pressure in chamber 22 as long as valve 28 is closed, to overcome the tension of spring 45 and hold the parts in the normal position shown in Figure 2.

With the pressure set in the above manner to the desired point, application of the chuck to a valve stem 17 forces the valve member 28 upwardly against the tension of its spring 29 thus allowing the fluid under pressure then within the chamber 22″ to flow into the tire. Assuming that the tire needs inflation, this pressure which is thus instantly established in chamber 22 will naturally be below the pressure of the spring 45 and the latter will thus force the diaphragm downwardly. With this movement of the diaphragm downwardly, the upright post 39, moving downwardly, will carry with it the tubular valve 40, thus unseating the upper end of the latter with respect to the seat 43. At the same time the internal shoulder of the tubular valve 40, engaging the upper end of the stem 37 will force this stem downwardly and unseat the lower intake valve 35 so that pressure from the air hose will then flow inwardly through the nipple 24 and the intake channel 23 to the bore 22 and from the latter through the outlet channel 25 and outlet valve 28 into the tire through the valve stem 17. At the same time a portion of this pressure will with the above mentioned valves open pass upwardly around the stem 37 which is loose within the tubular valve 40 and through the upper opening of this tubular valve into the chamber within the valve cylinder 33 and then from this chamber through opening 59 to the whistle tube 58. As the small portion of air thus escapes through the whistle tube the latter will be continuously sounded as pressure is supplied to the tire and until the pressure within the tire builds up to a point where the pressure within the bore 22 of the chuck body overcomes the spring 45 and forces the diaphragm upwardly so that the upper end of the tubular valve 40 again engages the seat 43, the parts in this position allowing the intake valve 35 to seat and cut off the flow of pressure from the nipple 24 into the bore 22. The tire is then properly inflated and when the parts resume the position shown in Figure 2 with the tire fully inflated it is obvious that air will be cut off from passage upwardly around stem 37 and thus sounding of the whistle will cease thus notifying the operator that the operation is complete.

Assuming, however, the device applied to a tire valve stem where the pressure within the tire is greater than the set pressure, this tire pressure, being within the chuck bore 22 will tend to force the diaphragm 31 upwardly against the tension of spring 45 from the position shown in Figure 2 which will shift the hollow post 39 upwardly and thus unseat the valve 41 at the lower end of the tubular valve 40 so that the pressure is free to pass upwardly around the tubular valve 40 into the chamber of the valve cylinder 33 and from thence outwardly through the opening 59 and through the whistle tube so that the signal will be sounded continuously during the escape of all of the pressure within the tire until that pressure is reached where the spring 45 again forces the diaphragm downwardly to the normal position permitting the valve 41 to again close. During this last mentioned operation it is obvious that the intake valve 35 is permitted to remain closed so that none of the pressure of the inflation hose 18, irrespective of what this pressure may be, can find its way into the chuck bore 22.

To recapitulate, valve 35 is unseated when the chuck is applied to a tire whose pressure is below the set pressure of the chuck and upon the unseating of this valve, air flows into the tire and also through the tubular valve 40 around stem 37 past the valve seat 43 and outwardly through the whistle tube so that during the flow of pressure into the tire, and until the set pressure has been reached, the signal will be sounded. The signal will also be sounded during the escape of air where the tire pressure is, upon the application of the chuck, greater than the set pressure, although in this latter instance the escaping air is forced to take a different outlet course from the chamber 22, namely around the tubular valve member 40 through the hollow post 39 with the valve 41 unseated from its normal position closing the lower end of said post 39. This different course is necessary as the diaphragm moving upwardly against the tension of spring leaves the upper end of the valve tube 40 seated against the seat 43.

Thus my improved device serves not only as an adjustable pressure feed chuck, but also as a pressure equalizing chuck in the sense that it not only supplies pressure to a predetermined point where such pressure is needed, but also relieves pressure to the same predetermined point in case there has been previous over-inflation. It is obvious that in so doing the operator can grasp the chuck and almost instantly adjust the same to the desired pressure, which is of particular advantage where it is desired to carry different pressures in the front and rear tires.

It is also obvious that my invention thus provides a simple inexpensive device for the purpose, as well as one which will be strong, durable and effective in use.

It is furthermore to be understood that I may utilize the chuck body with an outlet extension 61 threaded at one end into the lower portion of said body as shown in Figure 10. The opening through this extension forms a part of the outlet air channel and its outer end supports the outlet air valve 62 and the valve stem engaging nipple 63. In this way the valve stem may be engaged at a point offset from the chuck body, thus facilitating application of the chuck to truck wheels where there is little room between the spokes and also to disk wheels where there is very little room between the metal disk and the tire valve stem.

I claim:

1. A valve stem engaging chuck for inflation hose, including a body provided with a main bore and with intake and outlet channels in communication with said bore, a valve normally seated in the intake channel and cutting off the supply of pressure to said bore and having an upstanding stem, a diaphragm having one side exposed to the pressure of said bore, a spring acting against the opposite side of said diaphragm, a valve cylinder on the body housing the said spring and having a pressure outlet aperture, a hollow post rising through and connected to the diaphragm, a valve tube mounted loosely through the post and through which said valve stem extends, a valve seat carried by the upper end of the cylinder against which the upper end of said tube seats, said tube having an internal shoulder engaging the stem and having an enlarged lower valve member normally seated at the lower end of the post, and a cap on the cylinder, into which the cylinder aperture opens, having a pressure actuated signal member, as described.

2. A valve stem engaging chuck for inflation hose, including a body provided with a main bore and with intake and outlet channels in communication with said bore, a valve normally seated in the intake channel and cutting off the supply of pressure to said bore and having an upstanding stem, a diaphragm having one side exposed to the pressure of said bore, a spring acting against the opposite side of said diaphragm, a valve cylinder on the body housing the said spring and having a pressure outlet aperture, a hollow post rising through and connected to the diaphragm, a valve tube mounted loosely through the post and through which said valve stem extends, a valve seat carried by the upper end of the cylinder against which the upper end of said tube seats, said tube having an internal shoulder engaging the stem and having an enlarged lower valve member normally seated at the lower end of the post, a cap movable on the cylinder, having a pressure actuated signal member adjacent to the pressure outlet aperture of the cylinder, and means actuated by the cap for regulating the effective tension of the diaphragm actuating spring.

3. A valve stem engaging chuck for inflation hose, including a body provided with a main bore and with intake and outlet channels in communication with said bore, a valve normally seated in the intake channel and cutting off the supply of pressure to said bore and having an upstanding stem, a diaphragm having one side exposed to the pressure of said bore, a spring acting against the opposite side of said diaphragm, a valve cylinder on the body housing the said spring and having a pressure outlet aperture, a hollow post rising through and connected to the diaphragm, a valve tube mounted loosely through the post and through which said valve stem extends, a valve seat carried by the upper end of the cylinder against which the upper end of said tube seats, said tube having an internal shoulder engaging the stem and having an enlarged lower valve member normally seated at the lower end of the post, a cap adjustable on the cylinder, having a pressure actuated signal member adjacent to the pressure outlet aperture of the cylinder, a spring bearing member movable in the cylinder and engaging one end of the said diaphragm actuating spring, an element shiftable through the upper end of the cylinder, in engagement at their inner ends with the said spring bearing member and having their outer ends engaged by the cap.

4. A valve stem engaging chuck for inflation hose, including a body provided with a main bore and with intake and outlet channels in communication with said bore, a valve normally seated in the intake channel and cutting off the supply of pressure to said bore and having an upstanding stem, a diaphragm having one side exposed to the pressure of said bore, a spring acting against the opposite side of said diaphragm, a valve cylinder on the body housing the said spring and having a pressure outlet aperture, a hollow post rising through and connected to the diaphragm, a valve tube mounted loosely through the post and through which said valve stem extends, a valve seat carried by the upper end of the cylinder against which the upper end of said tube seats, said tube having an internal shoulder engaging the stem and having an enlarged lower valve member normally seated at the lower end of the post, a cap adjustable on the cylinder, having a pressure actuated signal member adjacent to the pressure outlet aperture of the cylinder, a spring bearing member movable in the cylinder and engaging one end of the said diaphragm actuating spring, an element shiftable through the upper end of the cylinder, in engagement at their inner ends with the said spring bearing member and having their outer ends engaged by the cap, said cylinder having an outstanding pin and said cap having an inclined slot in which the pin is movably disposed, whereby to shift the cap lengthwise of the cylinder when the cap is rotated, said cap having graduations thereon corresponding to the adjusted pressure of the diaphragm actuating spring.

5. A valve stem engaging chuck for inflation hose having valved air intake and outlet means and valved air escape means, spring actuated pressure controlled means in turn controlling the valve of the air intake means and arranged to open the air escape means to the outlet means upon actuation of the controlling means by its spring and also by air pressure, and graduated adjusting means for regulating the effective pressure of the actuating spring of said controlling means.

6. A valve stem engaging chuck for inflation hose having valved air intake and outlet means, spring actuated pressure controlled means in turn controlling the valve of said air intake, valved air escape means closed when the said controlling means assume normal position and arranged to open when said controlling means are shifted in opposite directions by spring pressure and air pressure, and an air actuated signal member arranged for actuation during exhaust of air through said air escape means.

7. A valve stem engaging chuck for inflation hose having valved air intake and outlet means, spring actuated pressure controlled means in turn controlling the valve of said air intake, air escape means including a signal member actuated during exhaust of air therethrough, and having a pair of valves one of which opens upon movement of the controlling means in one direction and the other of which opens upon movement of the said controlling means in the opposite direction, and means to regulate the effective pressure of the controlling spring.

WILLIAM A. HARRIS.